(12) United States Patent
Babbar et al.

(10) Patent No.: US 8,763,108 B2
(45) Date of Patent: Jun. 24, 2014

(54) FLOW CLASSIFICATION FOR ENCRYPTED AND TUNNELED PACKET STREAMS

(75) Inventors: Uppinder Singh Babbar, San Diego, CA (US); Satish Vangala, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1098 days.

(21) Appl. No.: 12/277,997

(22) Filed: Nov. 25, 2008

(65) Prior Publication Data

US 2009/0144819 A1 Jun. 4, 2009

Related U.S. Application Data

(60) Provisional application No. 60/991,087, filed on Nov. 29, 2007.

(51) Int. Cl.
*G06F 9/00* (2006.01)
*G06F 15/16* (2006.01)
*G06F 17/00* (2006.01)

(52) U.S. Cl.
USPC .......................................................... 726/13

(58) Field of Classification Search
USPC .......................................................... 726/13
See application file for complete search history.

(56) References Cited

U.S. PATENT DOCUMENTS

| | | | | |
|---|---|---|---|---|
| 5,835,726 A | * | 11/1998 | Shwed et al. | 709/229 |
| 7,913,294 B1 | * | 3/2011 | Maufer et al. | 726/3 |
| 7,920,548 B2 | * | 4/2011 | Lor et al. | 370/352 |
| 2006/0109829 A1 | | 5/2006 | ONeill | |
| 2007/0041373 A1 | * | 2/2007 | Lor et al. | 370/356 |

FOREIGN PATENT DOCUMENTS

| | | |
|---|---|---|
| EP | 1722524 A1 | 11/2006 |
| JP | 2005286451 A | 10/2005 |
| WO | WO2007046596 | 4/2007 |

OTHER PUBLICATIONS

Berger L et al: "RSVP Extensions for IPSEC Data Flows; rfc2207" IETF Standard, Sep. 1997, XP002189936 p. 2-p. 4 section A.4.
International Search Report and Written Opinion—PCT/US2008/084820, International Search Authority—European Patent Office—Jun. 24, 2009.
Kent K et al: "Security Architecture for the Internet Protocol; rfc4301" IETF Standard, Dec. 1, 2005, XP015043220 p. 13, line 34—p. 14, line 18 p. 38, lines 5-15 p. 51, lines 7-9 p. 56, line 12—p. 59, line 36.

* cited by examiner

*Primary Examiner* — Kambiz Zand
*Assistant Examiner* — Stephen Sanders
(74) *Attorney, Agent, or Firm* — James T. Hagler

(57) ABSTRACT

Methods and systems for solving the problem of special processing required by various communication network subsystems (e.g., QOS, security, tunneling, etc). In some cases the processing by one communication subsystem may result in modified IP data packets which may affect the application of additional processing of such packets. The methods and systems solve problem by translating filters and setting up additional tunnels or other procedures based on the use case so that all the end and intermediate nodes can do the required processing on modified packets. The methods and systems may take into consideration an overlap or intersection of two or more different types of packet filters. A first set of packet filters is translated to provide the desired packet classification for modified packets. The second set of packet filters may be translated based upon the translation applied to the first set of packet filters.

49 Claims, 11 Drawing Sheets

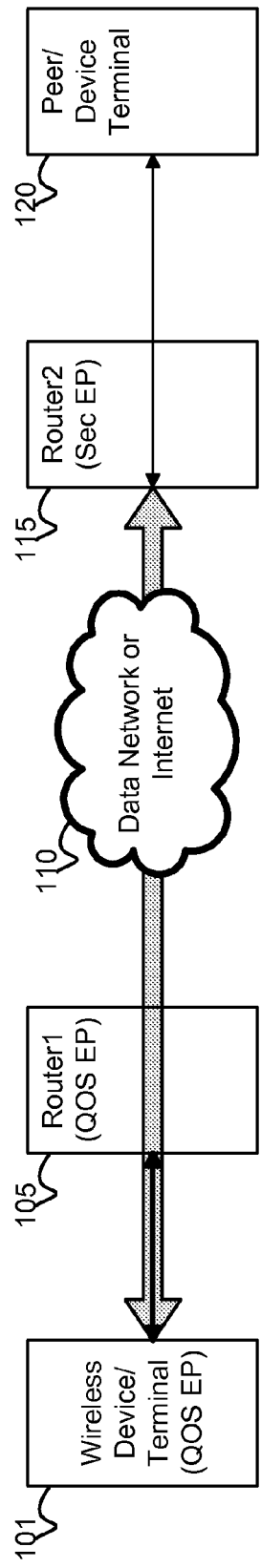
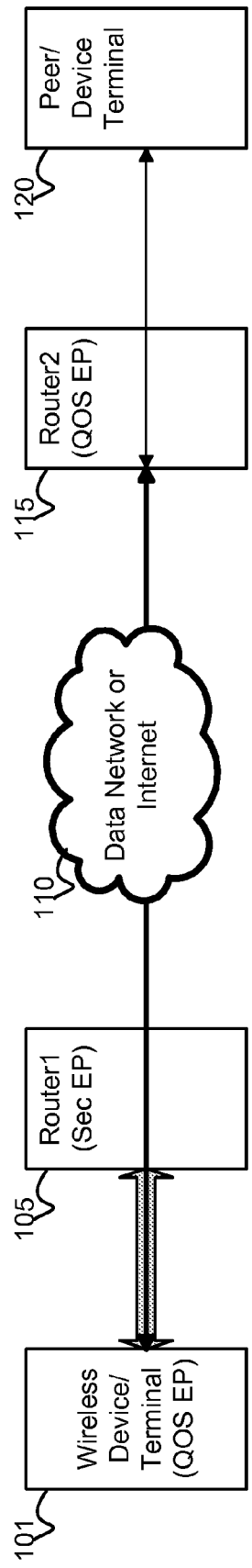

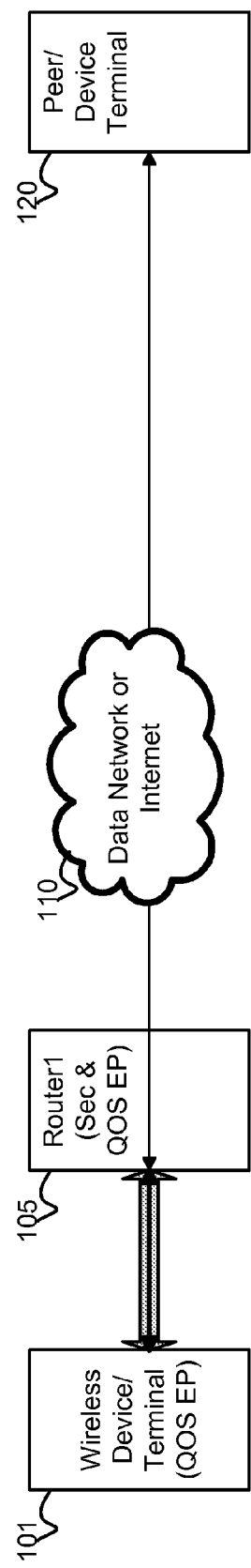
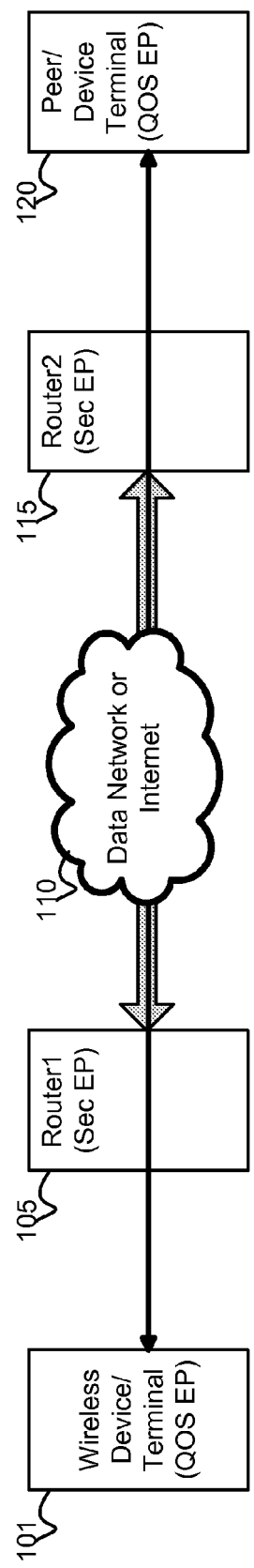
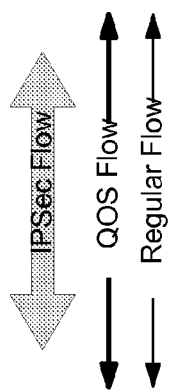
Fig. 1C
Fig. 1D

FLOW CLASSIFICATION FOR ENCRYPTED AND TUNNELED PACKET STREAMS

RELATED APPLICATIONS

The present application claims the benefit of priority to U.S. Provisional Patent Application No. 60/991,087 filed Nov. 29, 2007, the entire contents of which are hereby incorporated by reference.

FIELD OF THE INVENTION

The present invention relates generally to computer network communications and more particularly to flow classifications and ways to translate filters installed by either applications or network administrators.

BACKGROUND

Flow classification is the process of classifying network data packets into various logical streams called flows. When data packets are transported in Internet protocol (IP) traffic, the data packets may require specific processing performed on the data packets. The specific processing may be dictated by the application sending or receiving the data packets or by the communication path through which the data packets travel. The flow classification is typically performed by filtering packets based upon certain parameters. For example, in a wireless communication setting where noise and interference may occur on a link in the communication path, certain applications may require that a minimum quality of service (QOS) be maintained throughout the communication transmission. Therefore, filters may be implemented in routers along the communication path to recognize the data packets requiring the maintenance of a minimum QOS and to route those data packets along reliable channels in the communication path that will ensure the minimum QOS is satisfied.

In TCP/IP network communications, packet filtering typically is performed using various parameters in the TCP/UDP/IP headers, such as source and/or destination IP addresses, source and/or destination port numbers, protocol/next header fields etc. The specific processing performed on the IP data packet traffic need not be limited to the routing of the data packet. Filtering can also be performed using higher layer protocol header parameters such as from the Real-Time Transport Protocol (RTP) header or the Session Initiation Protocol (SIP) header. The parameters addressed by filters may also be part of an application layer header or an application payload body.

The basic concept of classification is to differentiate data packets, such as an IP packet, within the stream of IP packets based upon certain characteristics (defined by the filtering parameters) to enable special handling of the IP packets. Classification of packets into streams (referred to herein as flows) can be used to provide a wide variety selective treatments to packets in each flow within a network, such as firewall, QOS, security, header compression, billing, logging, etc.

When an end-to-end communication link is established, all traffic is treated using default QOS, and if an application requires special processing it will request QOS processing by specifying its application filters to appropriate nodes or routers in the link. Specific applications may require the deployment of additional filters which may dictate the handling and specific processing of certain IP packets being transported over the communication link. Conflicts among filters can happen when there are pre-existing security filters deployed on routers if an application requests QOS processing, in which case the security and QOS filters can intersect or conflict with one another.

In some instances, end nodes or intermediate routers may require additional processing on IP data packets, such as to perform tunneling, apply security measures, etc. In such situations processing on IP data packets may move, modify or encrypt the various parameters used to enable the filtering so as to render the original filter unable to properly recognize those packets. This may occur when the parameters in the IP traffic headers is encrypted or moved from their usual offset position. Such instances are referred to as modified packets for purposes of this description. For example, when Internet Protocol Security (IPSec) is implemented using an Encapsulating Security Payload (ESP) protocol with encryption, the transport and higher headers may be encrypted. Consequently, filtering based on port numbers or other higher layers headers such as RTP cannot be properly performed.

As another example, when IP tunneling communication mechanisms are employed, the IP tunneling process encapsulates the IP data packet into one or more IP or higher layer headers. As a result, the parameters that are acted upon in a typical filtering procedure are dislocated (i.e., offset) from their usual position. Consequently, filtering based on these parameters may not be properly performed. Examples of commonly occurring IP tunneling scenarios which creates problems for conventional filtering operations include Mobile IP, IPv4-IPv6 interworking, and IPSec.

SUMMARY

Various embodiments provide methods for translating IP data packet filters so that the intended classification of IP data packets may be accomplished when packet processing modifies IP data packets. In some scenarios filter modifications further involve setting up of additional tunnels to meet all QOS requirements. In an embodiment an IP data packet filter is translated when IP data packets are subject to two different IP data packet filters and the IP data packets may be modified. In another embodiment, an IP data packet filter is translated when IP data packets are subject to a first IP data packet filter but only a portion of the IP data packets are subject to a second IP data packet filter and the IP data packets may be modified. The portion of IP data packets subject to each of the first and second IP data packet filters may vary.

The various embodiments provide methods for solving the problem of special processing required by various subsystems (e.g., QOS, Security, tunneling, etc) at different nodes or layers in the end-to-end communication link. In some cases the processing by one subsystem or one node may result in a modified IP data packet which may affect the application of additional processing. To solve this problem, the various methods translate filters as required based on the use case so that all the subsystem and intermediate nodes can do the required processing on modified IP data packets. In some cases filter translation alone may not provide the same flow classification, in which case additional control procedures may also be implemented, such as establishing an additional tunnel to achieve the same flow classification after IP packet modification in a particular layer/node.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

FIGS. 1A-1E illustrate various communication network topology scenarios involving IP communications subject to QOS requirements and IPSec encryption.

DETAILED DESCRIPTION

Figure 1E:
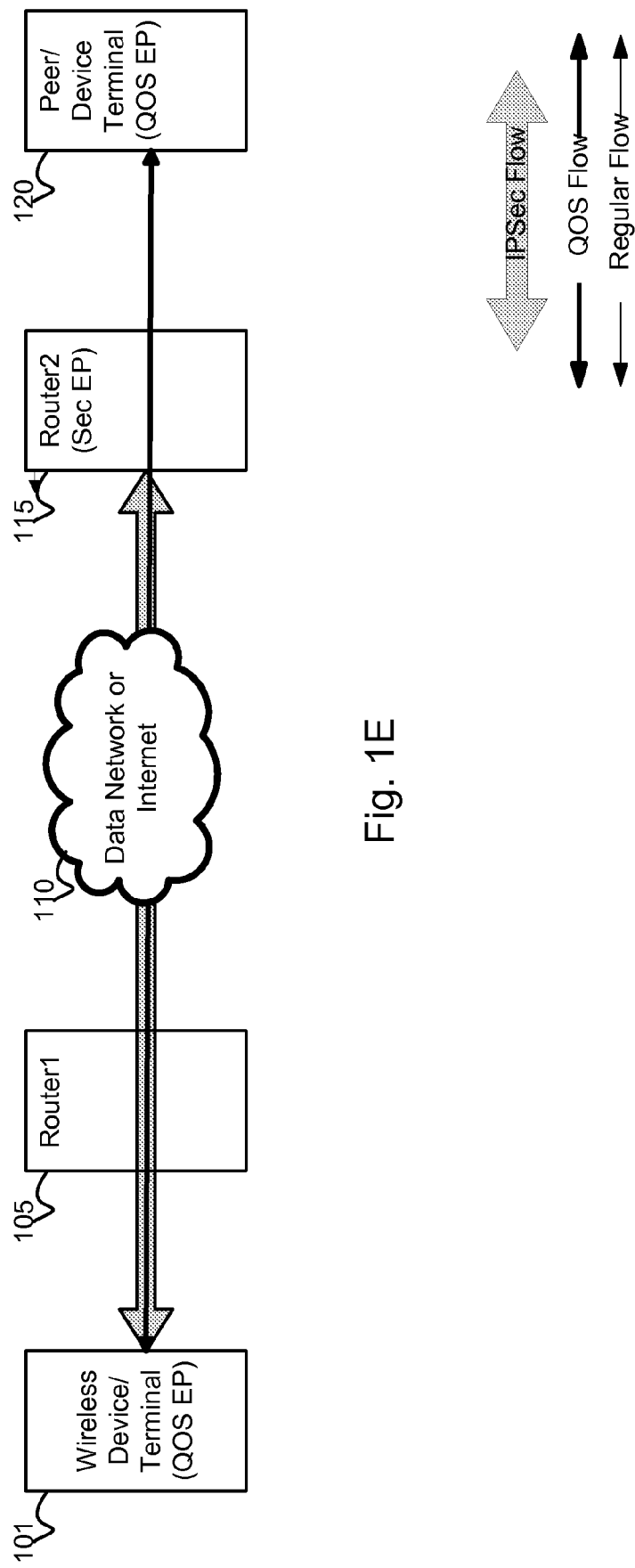

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "computer," "computing device" or "mobile device" refer to any one or all of personal computers, notebook computers, cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor, memory and are capable of communicating via a data communication network.

In this description, the terms "exemplary" is used herein to mean "serving as an example, instance, or illustration." Any implementation described herein as "exemplary" is not necessarily to be construed as preferred or advantageous over other implementations.

When an end-to-end communication link is established, all traffic is treated using default QOS. When an application running on an endpoint device/terminal requires special handling of IP data packets utilized by the application, appropriate filters may be deployed to the routers/gateways in the communication link to direct the handling and routing of IP data packets associated with the application. In some cases, IP data packets require classification by multiple filters. However, because IP data packets may be modified during communication processing (e.g., when packets are encrypted or packaged for tunnel routing) default or standard filters may not be able to recognize modified IP data packets, and therefore may not be able to perform their intended packet classification function.

An example of IP packet filtering is a filter intended to recognize packets for which there is a QOS minimum requirement so those packets can be routed over reliable communication links. (For ease of reference, QOS filters are identified in the figures and equations herein as "Q".) Such filters are particularly useful in communication networks including wireless communication links in which various links have different signal quality. When an end-to-end communication link includes a wireless device/terminal, a quality of service (QOS) filter may be deployed in all routers along the network path where QOS is provided so that each router can properly classify and direct the IP data packets over particular wired or wireless links that satisfy the minimum QOS requirement to provide the desired treatment on the forwarding link. In some implementations or network configurations QOS handling may only occur in the wireless link, in which case the QOS filter may be deployed just to the router or routers serving as wireless endpoints. Also, in some implementations, QOS handling may be applied within an intermediate link (e.g., when a wireless communication link provides a connection between two wired networks), so QOS filters are not limited to a node on an endpoint of the network path. QOS or other types of filters may be deployed to all routers within the network path or only to nodes on an endpoint of the network path.

As an example, a mobile device may send and receive a SMS text messages while also receiving streaming video from the Internet. IP data packets associated with the SMS text messaging application do not require high QOS since packets can be retransmitted until the entire message is properly receive. However, the IP data packets associated with the streamed video application will require a high QOS communication to ensure that the packets are received accurately. To route the SMS message and streaming video packets over the appropriate air link to the mobile device (or other links within the network path) a QOS filter deployed on an appropriate router may classify the IP data packets being sent to the wireless device as either requiring QOS routing or not. To do this, the QOS filter may sample a particular set of bits within the IP data packet header to determine whether the packet requires QOS routing. IP data packets classified as requiring QOS routing (i.e., the video packets in this example) can be routed into a packet flow that will be routed over a high QOS communication link, while other IP data packets (i.e., the SMS message packets in this example) can be routed over another communication link.

An alternative method for properly routing QOS packets to provide end-to-end QOS routing involves using Differentiated Services Code Point (DSCP) marking in the IP header of data packets. In this scheme a special integer value is assigned to each flow type and is included in the TOS field of the IPv4 header or Flow label field in the IPv6 header. These values are marked in the outermost IP headers which are accessible to all routers along the path. If a packet is modified such that headers are encrypted or additional headers are appended in the front, any router modifying packets should copy the DSCP marking to the outermost IP header being appended, thereby making the DSCP marking value visible to routers at points along the network path. DSCP marking indicates to each router along the network path how to treat the packet and provide any desired QOS handling. Semantics of various DSCP values are defined by each service provider/network administrator. This method is only effective if all the routers along the network path understand the intended semantics of the DSCP values. In this method, only the first hop (i.e., the originating node or router) needs to perform the packet classification for QOS because all other routers along the network path can rely on the DSCP value alone.

Another common filter employed in IP data communications classifies encrypted IP data packets. Encrypted IP data packets require special processing, such as routing them to the end point where they will be decrypted. Thus, security filters may be deployed within a communication link in which some or all of the IP data packets will be encrypted at some point. (For ease of reference, security filters are identified in the figures and equations herein as "S".)

While such IP data packet filtering works well in the examples above, problems may result when conflicting communication requirements are imposed upon the same communication link. A particular example of such problem involves communication links in which a portion of the link is subject to QOS requirements and security measures (e.g., IPSec). Such a scenario occurs when a wireless device is configured to communicate securely by encrypting IP data packets allowing a user to send and receive sensitive data, various security measures may be desired. For example, an end-to-end communication connection may be established between a mobile device and a work server to provide a virtual private network (VPN) capability. A user may utilize such an encrypted communication connection to send and receive sensitive information. In most cases encrypting IP data packets involves encrypting the entire packet and including the encrypted results within another IP data packet that has a modified header (i.e., a packet header that is different from that of the original IP data packet). Consequently, the parameters in the original (i.e., not encrypted) packets may not be accessible to classification filters, and those parameters that are included in the new packet header are likely in a different offset location. With the filtering parameters inaccessible or moved from their usual offset location, classification filters, such as the QOS filters in the intermediate routers, may not be able to classify IP data packets into the desired flows.

The various embodiments overcome these problems by providing a standard mechanism for translating filters to address the various scenarios in which IP data packets are subject to modification. Translated filters are able to properly classify the IP data packets by accommodating the packet header modifications. The translated filters can then be deployed to various routers/gateways along the communication path of a particular communication session. In this manner, the network nodes in a communication link can properly classify and route IP data packets even when the packet headers have been modified. Thus, for example, if IP data packets are transmitted using IP tunneling or encryption, the IP data packets intended for use by a specific application or requiring QOS routing can be classified into the proper flows by the translated filters. While the various embodiments are discussed herein with respect to IP data packets and IP based networks, the embodiments may be extended to other types of networks or protocols. The various embodiments provide methods for solving the problem of special processing required by various subsystems (e.g., QOS, security, tunneling, etc) at different nodes or layer in the end-to-end communication link. In some cases the processing by one subsystem or one node may result in a modified IP data packet which may affect the application of additional processing. To solve this problem, the various methods translate filters and set up additional tunnels or other control procedures as required based on the use case so that all the subsystem and intermediate nodes can do the required processing on modified IP data packets.

Traffic flow direction must be considered separately in order to determine proper deployment of a translated filter. In most cases, uplink or reverse link traffic from a mobile device to the network is originated in the mobile device. The mobile device can apply a filter to classify the IP data packets before the IP data packets are modified by an IPSec driver, mobile IP stack, or similar subsequent modification. However, for the forward/downlink IP data packets flowing from the network to the mobile device, the filtering or packet classification may not occur at the same node as the IP data packet modification. For example, IPSec encryption of packets may be performed at the far end of a communication link while QOS classification may be performed at the wireless gateway (i.e., where IP data packets are routed to the mobile device over a wireless data link). Accordingly, in most scenarios filter translation will be required for forward/downlink IP data packets.

As an example, FIGS. 1A-1E depict various scenarios in a network topology in which QOS flows may conflict with and/or intersect IPSec encryption flows.

In the network topology shown in FIG. 1A, an end-to-end communication link has been established between a wireless device/terminal 101 and a Peer device/terminal 120. The communication path includes a router1 105 and router2 115 which each serve as gateways to a data network or Internet 110. The data network and the Internet 110 may include a plurality of additional routers and nodes which merely complete the communication link by relaying data packets according to information contained in the packet headers. As each of these nodes merely serve as via points, these nodes may be collectively referred to as the data network or Internet 110. In the scenario shown in FIG. 1A, on the forward/down link the peer device/terminal 120 sends IP data packets to router2 115 via a data link that is not subject to QOS requirements. In this scenario, router2 115 operates as the security endpoint (Sec EP) which encrypts the IP data packets using an IPSec driver. The encrypted IP data packets may then be sent over an unsecured data network or the Internet 110 to router 1 105. Router1 105 operates as a QOS endpoint (QOS EP) which prepares the IP data packets for transmission over a wireless communication link to the wireless device/terminal 101. Since the transmission of IP data packets to the wireless device/terminal 101 occurs over a wireless communication link, QOS flows must be established to ensure packets are transmitted over transmission paths with sufficient signal quality or at appropriate data transmission speeds to assure accurate reception of IP data packets. Accordingly, QOS filters may be deployed to router1 105. Since router 1 105 receives encrypted IP data packets from router2 115, it is likely that the deployed QOS filter will not operate properly on the encrypted IP data packets which have been modified by encryption. Consequently, the original QOS filter will not be able to classify the modified IP data packets at router1 105 and provide the necessary QOS. Accordingly, the mobile device must translate the QOS filter and install the translated filters in router1 105 which provides QOS support for the wireless link.

However, on the reverse/up link no filter translation will be needed since the wireless device/terminal 101 both encrypts and imposes QOS requirements on IP data packets. Thus, the wireless device/terminal 101 can perform QOS classification using QOS filters before encrypting the data packet. Thus, packet modification and QOS classification occur in the same node of the communication link. Consequently, the router1 105 can process received IP data packets using the security filters only without the need for further translation on the reverse/uplink as no specific QOS is provided to the IP packets beyond router1 in this example network path.

FIG. 1B shows a second scenario network topology in which IP data packets are sent over a secured wireless data link and then transmitted unencrypted over a data network or Internet 110 with QOS routing extending up to router2 115. Thus, security encryption is not implemented on the forward/downlink until IP data packets are transmitted over the wireless communication link between router 1 105 and the wireless device/terminal 101. In this scenario, router1 105 on the forward/downlink operates as a security endpoint applying the necessary encryption before IP data packets are transmitted over the wireless communication link. Thus, on the forward/downlink path IP data packets are not modified until they are received by router1 105 and transmitted over the wireless communication link. Consequently, no filter translations are required on the forward/downlink at any router providing QOS along the network path. On the other hand, router1 performs the QOS classification using QOS filters before modifying/encrypting the data packet in order to avoid QOS filter translation in this example network path. The original filters deployed to router2 115 receive unmodified IP data packets, and thus can classify the packets properly to provide the necessary QOS flows.

In this second scenario, no filter translation is needed on the reverse/uplink path since the wireless device/terminal 101 both encrypts and thereby modifies the IP data packets but also classifies the IP data packets for QOS requirements. Thus, packet modification and QOS classification occurs in the same node of the communication link. router1 105 restores the modified packets to original packet configurations so that beyond Router1 packets are transmitted unmodified, hence there is no need for translating QOS filters along the uplink path. Consequently, no filter translation and deployment is necessary for the reverse/uplink in this example network path.

FIG. 1C illustrates a third scenario network topology in which IP data packets are sent to/from a wireless device/terminal 101 over a secured wireless data link and then transmitted unencrypted over a data network or Internet 110 to a peer device/terminal 120 without the use of a router2. In this scenario, on the forward/down link path IP data packet encryption and QOS classification occur at the same node, namely router1 105. As such, no filter translation is required for the forward/downlink. Similarly, no filter translation is needed on the reverse/uplink path since the wireless device/terminal 101 both encrypts the IP data packets (thereby modifying the packet header) and classifies the IP data packets for QOS requirements. Thus, packet modification and QOS classification occurs in the same node of the communication link.

FIG. 1D illustrates a fourth scenario network topology in which encryption/decryption occurs at the routers (router1 105 and router2 115) while QOS packet routing extends from the wireless device/terminal 101 to the peer/device terminal 120. In this scenario IP data packet modification occurs in both routers 105 and 115 when the packets are encrypted. Since IP data packets are encrypted and decrypted at the routers 105 and 115, the terminal devices 101 and 120 can perform the QOS classifications without any trouble as the IP data packets sent and received by the terminal devices 101 and 120 are unmodified. But other routers along the path between Router1 and Router2 require translated QOS filters since they will only receive modified packets.

FIG. 1E shows a fifth scenario network topology in which an IPSec tunnel is established between device 101 and Router2 115, while QOS routing is provided end-to-end, i.e., between the wireless device/terminal 101 and the peer/device terminal 120. On the forward/downlink path the IP data packets are modified in the router2 115 to provide security encryption. Since router2 receives unmodified IP data packets in the forward/down link from the peer/device terminal 120, the router2 115 can perform the QOS classification to produce the required QOS flows. Thus, the IP data packet modification and QOS classification occurs in the same node (router2 115). Subsequently, filter translation may also be needed in other routers along the forward link path since those routers only receive the modified IP packets. No filter translation is required on the wireless device 101 for the reverse/uplink path since the device/terminal 101 both encrypts (and thereby modifies) and classifies the IP data packets for QOS requirements. But filter translations may be needed for other routers along the reverse link path as they receive the modified IP packets. On the other hand, router2 restores the IP packets to original form and can only use non translated QOS filters for the reverse/uplink data path.

The above scenarios can also be applied to other use cases described above such as QOS over Mobile IP. Again the first scenario (FIG. 1A) is most common for Mobile IP since a Mobile IP tunnel terminates at a home agent (HA) which is behind the first hop router. A typical example is the Packet Data Servicing Node (PDSN) in CDMA networks. QOS communication routing is typically accomplished between the mobile device and the PDSN while IP tunnel is accomplished between the mobile device and the HA.

The network paths illustrated in the scenarios depicted in FIGS. 1A-1E are intended to illustrate some but not all possible network configurations in which filter conflicts may arise. Filter conflicts arising in other network path configurations may be addressed using the various methods and systems described herein even though such configurations are not included in the examples shown in FIGS. 1A-1E.

The situation where processing of IP data filters renders one or more deployed packet filters ineffective (typically because the filtering parameter(s) in the header are displaced or encrypted) can be determined by the node (end device or router) that is modifying an IP data packet and also providing QOS processing. That node can determine that there will be a conflict in the filters by recognizing that the two types of packet processing are to be implemented, such as by comparing a packet processing state to a logic table or decision tree. When the node determines that a filter conflict will occur, it may respond by implementing the appropriate action of generating translated filters and propagating the translated filters to all routers along the network path. The first node that detects that a certain packet requires QOS classification and is also subject to modification (e.g., due to IPSec, tunneling, etc.) must take this action. This determination is implementation dependent as it is localized within one node, with that node being configured with all of the information necessary to make this determination. Such a node then performs the filter translations and sends the translated filters all the way to the relevant routers along the network path. If the filter translation happens in a router which is not the originator of the QOS at the first place (see FIG. 1D), that router should still propagate the translated filters to the appropriate set of routers.

QOS filters may be deployed by the QOS requestor node on all the routers along the network path up to the point where QOS is provided. QOS can be requested by the same node for both uplink and downlink or each end node can request it for one direction each or a combination thereof. The node translating filters will send the translated filters to all routers along the path up to the point where QOS is provided or when a translation endpoint is hit, which ever is earlier in the network path. The translation endpoint can drop the translated filters since that node can classify the unmodified packets using the original filter(s).

Figure 3:
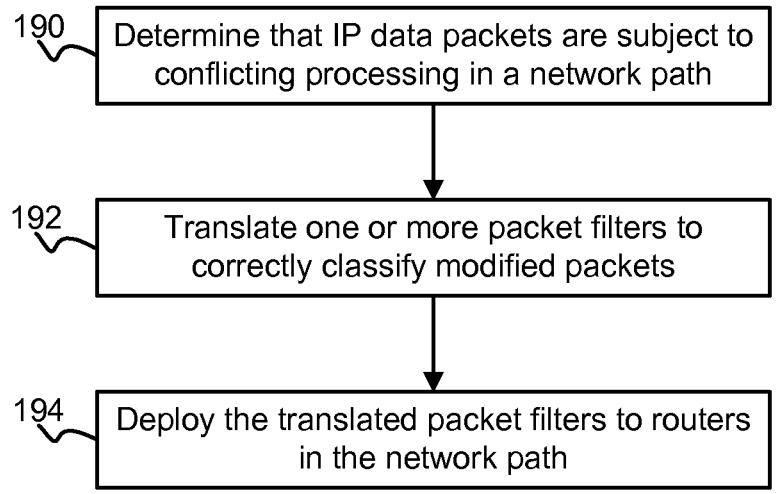
FIG. 3 is a process flow diagram of an embodiment method for resolving problems due to IP data packet modifications by communication services.

FIG. 3 illustrates a method for solving the problem of special processing required by various subsystems (e.g., QOS, security, tunneling, etc) at different nodes or layer in the end-to-end communication link. A node within a network path may determine that a conflict in packet classification filters exists due to two conflicting processes being applied to particular IP data packets (e.g., QOS classification and IPSec processing or tunneling, etc), step 190. Depending upon the nature of the modifications to IP data packets implemented on the network path, and thus the manner in which packet filters are affected or placed in conflict, the packet filters are changed or translated into translated packet filters which will result in the desired classification of the modified IP data packets, step 192. This translation step results in translated packet filter(s) that will classify modified IP data packets in the same manner that the original packet filler will classify unmodified packets. The translated packet filters are then deployed to routers in the network path, step 194.

As discussed above, problems with deployed packet filters and conflicts among deployed packet filters resulting from modifications to the IP data packets can be resolved by translating the deployed filters to translated filters which will generate the desired IP data packet flows on the modified packets. Filter translation mechanisms will vary based on the use case and the type modification that will be performed on the packet stream. The term "filter translation" refers to modifications made to each filter in a given filter set that enable the translated filter set to classify modified packets in the same manner that the unmodified filter set classifies unmodified packets.

In a hypothetical example, a packet P includes a header with 3 fields followed by a payload. Thus:

$P=[Field1][Field2][Field][ \ldots Payload \ldots ]$, where Field1, Field2 and Field3 are 2 bytes long each.

As a further element of this hypothetical example, a filter set F includes one filter f which is set to match packets whose Field2 value equals 100. This filter can be represented as f: Field2=100. Typically, each filter is represented by an offset/value/length triplet. For example filter f may be configured as follows: f: Offset=2, Value=100, Length=2. In this example, any packet of type P carrying a 2 byte value equal to 100 at offset 2 (starting from offset 0) will match filter f.

For purposes of illustration, packet P may be modified in one of the network routers, such as by adding a preamble to the header to create a modified packet P' as follows:

$P'=[ \ldots Preamble \ldots ][Field1][Field2][Field][ \ldots Payload \ldots ]$, where the Preamble is 10 bytes long in this example.

This example illustrates the problem addressed by the various embodiments. If filter f is applied to this modified packet P', it will fail the match the filter criteria or may erroneously match the filter criteria if the value 100 appears in the two bytes at offset 2 in the preamble. In order for the filter to correctly detect a match the filter needs to be translated to account for the preamble, such as by increasing the filter's offset by the length of the preamble as follows:

$f'$: *Offset*=12, Value=100, Length=2.

Translated filter f' will correctly match the modified packet P' to achieve the same result as is accomplished by filter f operating on the unmodified packet P.

In the above example, if the packet modification includes encrypting or modifying the contents of the original packet P, then the translated filter f' will also fail to match the modified packet P'. Hence more advanced filter translation would be required in such a case.

If an IP packet is re-encapsulated in one or more IP or transport headers, then the filter translation will involve shifting the offset of the filters to account for the transport headers. This translation can be achieved directly or indirectly. In a direct method, a new offset value is specified in the filters, with the new offset value reflecting the additional offset associated with the transport headers. In an indirect method, the translated filter may indicate the position of the original header in the modified packet to enable applying the filter offset to the fields of the original header. For example, an original IP data packet P may take the form:

$P$=[IP HDr1][TCP Hdr1][Payload], where the payload data is preceded by a IP data header (IP HDr1) and a TCP data header (TCP Hdr1). The modified IP data packet may take the form:

$P'$=[IP Hdr2][IP HDr1][TCP Hdr1][Payload], where the modified IP data packet includes an additional IP header (IP Hdr2).

An application operating on the wireless device/terminal 101 or peer device/terminal 120 may specify an original filter to generate a flow as follows:

$f$: source IP address=$x$.

This filter may be deployed to the appropriate router (depending on forward or reverse link processing) to provide the desired processing of the IP data packet. Thus, any IP data packet received by the router from a particular source IP address would be classified by the filter to receive a desired processing "x". The desired processing x may be any of a number of processing functions. For example, if x were a QOS function, the IP data packet received from the particular source IP address may be routed through a particular air link in the wireless communication link to provide a minimum QOS. As another example, the function x may encrypt the IP data packet. Thus in this example, any IP data packet received from the particular source IP address may be encrypted in accordance with the function x.

In this example, the filter delivered to the router without any IP data packet modification P may appear as: f: source IP address=x, IP hdr #1. The translated filter delivered to the router for modified packets may appear as:

$f'$: src IP address=$x$, IP Hdr #2, where IP Hdr #2 is added in accordance with IP data packet modification P'.

The use of direct or indirect filter translation methods can be built into the signaling protocols that are used to communicate filter sets to various nodes in the network. For example, 3GPP2 QOS specifications require a bit to indicate an inner or outer IP header in the messages that pass translated filter templates (TFTs) to the PDSN. This protocol only allows for one IP header encapsulation.

More sophisticated methods are typically required to translate filters for IPSec packets that are encrypted. IPSec includes two modes of operation: transport mode and tunnel mode. These modes involve modifying IP data packets in the following ways:

Transport Mode $P$=[IP HDr1][TCP Hdr1][Payload]

$P'$=[IP HDr1][ESP/AH][*xxx* Encrypted Payload *xxx*]

Tunnel Mode $P$=[IP HDr1][TCP Hdr1][Payload]

$P'$=[IPHdr2][ESP/AH][*xxx* Encrypted Payload *xxx*]

In the nomenclature above ESP stands for Encapsulating Security Protocol and AH stands for Authentication Header. IPSec (IP security protocol) includes two protocols for the IP layer: IP Authentication Header (AH) and the Encapsulating Security Protocol (ESP). These protocols may be applied alone or in combination with each other. AH provides for anti-replay and verifies that the contents of the packet have not been modified in transit. AH is a mathematical code that is embedded and transmitted in the IP packet and may be applied alone or in combination with the ESP. ESP provides data confidentiality (encryption), anti-replay, and authentication. ESP encapsulates data in the IP packet and may be applied alone or in combination with AH.

In either of the tunnel or transport modes, if encryption is accomplished, either one or more original headers of the IP data packets become inaccessible. Hence the filter translation in such situation relies on mapping original filters to those fields in the headers that remain accessible. In the transport mode only the original IP header and ESP or AH parameters are accessible. The TCP header will be encrypted and thus no longer be accessible to a filter. Therefore, any original filter that relies on the TCP header to generate a desired flow will be rendered useless after the IP data packet is encrypted. Accordingly, a translated filter will need to look to the original IP header, ESP or AH parameters to properly classify the IP data packet and generate the desired flow.

In the tunnel mode only the outer IP header which is different from the inner IP header (which was the original IP header on the IP data packet) and ESP or AH will be accessible (i.e., unencrypted). Accordingly, a translated filter for IP data packets that are transported via a communication channel (the IP tunnel) that uses encapsulation technologies across an intermediate network will have to rely on the outer IP header and ESP or AH fields to classify the IP data packet and generate the proper flow. IP tunneling may occur, for example, when the user seeks to establish an end-to-end communication link over a virtual private network (VPN) or through islands of IPv6 implementations across the IPv4 Internet. In IP tunneling, every IP data packet is encapsulated within another packet format that is native to the transit network. Consequently, when the IP data packet is encapsulated, a number of the original parameters appearing in the header of the IP data packet will no longer be accessible to filters.

Various embodiments translate filters by mapping the original filters to a new filter set comprised of the destination IP address, protocol (ESP/AH) and security parameter index (SPI). These 3 fields also uniquely identify each IPSec flow, which is called a Security Association (SA) in IPSec terminology. A main SA can be split into multiple child SAs in order to segregate an IPSec stream into multiple secured streams each potentially using the same or different security algorithms. The protocol field in the outer most IP header is either ESP or AH. The SPI is the security identifier in ESP or AH field. The destination IP address is extracted from the outer most IP header. The following algorithm describes how to map original filters to IPSec based translated filters assuming that the original filters are meant for QOS classification. The main idea in these embodiments is to represent each QOS flow into one or more IPSec child SA in order to identify QOS streams using IPSec streams. This way the original QOS filters are not required for classification.

The description of this embodiment employs the following notation:

Q=Set of filters representing a requested QOS flow;

Q'=Set of filters translated from filters in Q such that same classification is achieved when Q is applied to original stream and Q' is applied to IPSec stream;

S=Set of filters representing a requested/configured IPSec flow (or IPSec SA);

S'=Set of filters translated from filters in S such that same classification is achieved when S is applied to original stream and S' is applied to IPSec stream;

q1, q2 . . . =Subset of filters constituting Q such that q1+q2+ . . . =Q;

s1, s2 . . . =subset of filters constituting S such that s1+s2+ . . . =S;

q'1, q'2 . . . =Subset of filters constituting Q' such that q'1+q'2 . . . =Q s'1, s'2 . . . =Subset of filters constituting S' such that s'1+s'2+ . . . =S';

An S to S' translation is performed by mapping each filter in filter set S to a corresponding filter in translated filter set S' constituting the destination IP address, Protocol (ESP/AH) and SPI as described above. If filter set S is split into multiple IPSec streams (Child SAs), each of the filters used to identify each Child SA may be mapped to a corresponding filter constituting the destination IP address, Protocol (ESP/AH) and SPI using the same procedure.

The various embodiments perform a translation of QOS filters Q to translated QOS filters Q' depending on the intersection between the set of filters Q representing the QOS flow and the set of filters S representing a requested or configured IPSec flow. While or after negotiating a communication link, the communicating devices may determine the nature of packet modifications that will occur over the communication path (e.g., encryption) and the degree to which there is an overlap or intersection between a first set of packet filters, such as IPSec filters, and a second set of packet filters, such as QOS filters, in the given communication path. The nature of the packet modifications may be determined based upon the applications transmitting and receiving data. The degree of overlap or intersection may be determined based upon the types of communication links involved in a given communication session (e.g., wireless communication links connecting to the Internet), the applications sending or receiving packets and the determined modifications to packets in the given communication path. A limited number of possible filter overlap or intersections are possible between two types of packet filters. The possible intersection scenarios are illustrated in FIGS. 2A to 2E. For each of the possible filter intersection scenarios the translation of original filters may be performed using the appropriate method among those illustrated in the process flow diagrams shown FIGS. 4-8. The process flows illustrated in FIGS. 4-8 assume an intersection between QOS flows and IPSec flows, but the methods are applicable to other types of packet flows and filters whose overlaps or intersections are similar to those illustrated in FIGS. 2A-2E. One of ordinary skill in the art will appreciate that other types of IP data packet filters translations may be implemented in the same fashion as described below with reference to FIGS. 4-8.

Figure 2A:
FIGS. 2A-2E illustrate various filter modifications appropriate for the network topology scenarios illustrated in FIGS. 1A-1E.

FIG. 2A depicts the network scenario in which the QOS flows are equivalent to the IPSec Process flows (i.e., Q=S). In such a situation, all of the IP data packets subject to the QOS filter are also subject to the IPSec filter.

Figure 4:
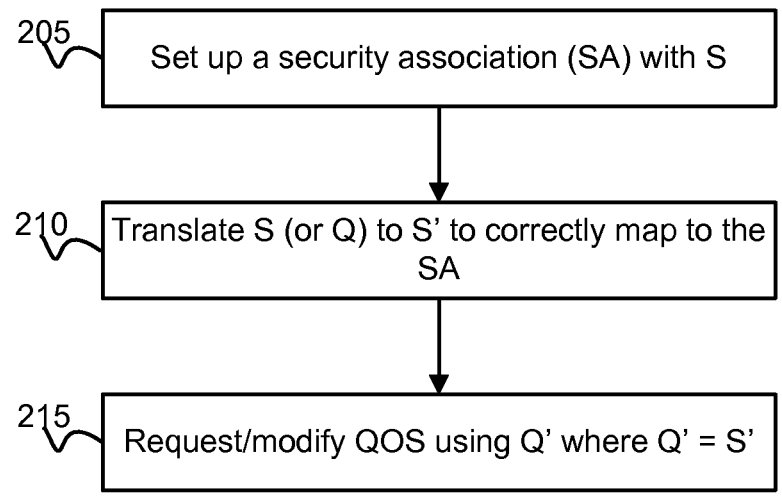
FIGS. 4-8 are process flow diagrams of embodiment method that may be implemented to translate IP data packet filters that may be implemented in various network topology scenarios.

FIG. 4 illustrates a process flow of an embodiment method for translating a QOS filter or IPSec filter when the QOS filter and the IPSec filter classify exactly the same IP data packets (i.e., the filters classify the same packets even though the filter parameters may be different). Such a situation is analogous to the scenario illustrated in FIG. 2A. Referring to FIG. 4, a security association (SA) is setup with the IPSec filter, step 205. Put another way, security keys between the security endpoints of an IP tunnel are negotiated so that only the two endpoints can view the packet data. As an example, when a user tries to log in remotely to a secured server (e.g., 120), security precautions must be taken so that no IP data packet is sent to the remote terminal endpoint in the clear. Accordingly, security keys between the secured server and the remote terminal endpoint are negotiated so that only the secured server and the remote terminal endpoint are able to view the IP data packets. While multiple IP tunnels may be negotiated between the remote terminal endpoint and the server, each tunnel will only be used for particular traffic. Each tunnel may implement varying degrees of encryption protection to satisfy different transmission needs along the communication link. In this manner, with the user logging in to a secured server from a remote terminal, different applications may require varying degrees of secured data. For example, the user may transmit IP data packets for a video conference call as well as confidential sales data. The IP data packets for the video conference call application may not be sensitive so those IP packets may be routed via an IPSec filter so they are transmitted through a tunnel using less secure encryption. However, the confidential sales data may be recognized by the application as being highly sensitive information that should be transmitted over a tunnel implementing high security encryption. Thus, appropriate IPSec flows can be implemented by filters that check whether the packet contains video or text information. In this example, the QOS requirements for the two data streams (i.e., video and data) also depend upon the contents of the data packet. This is because video packets are sensitive to transmission quality as images cannot wait for retransmission of packets without causing flicker and dropped packets will degrade the image quality. In contrast, data packets may be retransmitted if packets are lost on low QOS communication links. Thus, appropriate QOS flows can be implemented by filters that check whether the packet contains video or text information. Since packets classification achieved using IPSec and QOS filters is exactly the same, Q=S.

Once the security association (SA) has been setup with the IPSec filter, the IPSec filter S is translated into the translated IPSec filter S', step 210. Translated IPSec filter S' is a filter that will achieve the same classification on encrypted packets as the original IPSec filter S has on unmodified IP data packets, so the security association (SA) will be correctly mapped even when the IP data packets are encrypted. The translation of S to S' may be accomplished using methods like those described above. After the IPSec filter is translated, the IPsec filter S' is used to perform QOS classification instead of Q, in other words translated QOS filter Q' is the same as S', Q'=S'., step 215. In this manner, the translated QOS filter will also properly classify IP data packets into their appropriate QOS flows even when the IP data packets are encrypted.

Figure 2B:
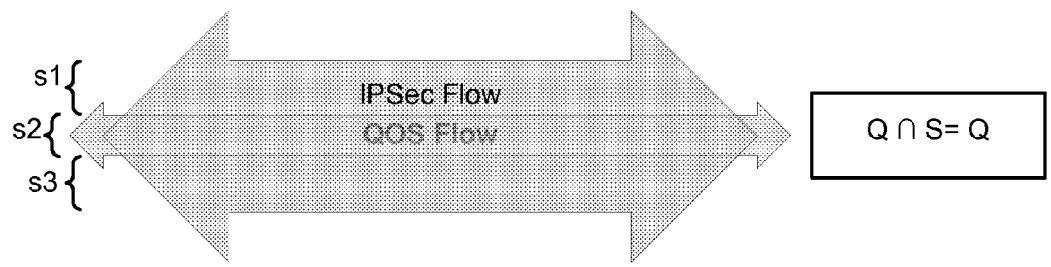

FIG. 2B depicts the network scenario in which the QOS flows are less than the IPSec process flows such that the intersection of the QOS flows with the IPSec flows encompasses the QOS process flows (i.e., Q∩S=Q). In such a situation, all of the IP data packets subject to the QOS filter are also subject to the IPSec filter, but a number of the IP data packets subject to the IPSec filter are not subject to the QOS filter. In this situation, there may be varying levels of security encryption implemented by the IPSec filter set S. Each of these varying levels of security may be represented by subset security filters s1, s2, s3. In the illustrated example, all of the IP data packets subject to the QOS filter may also be consistent with or subject to the IPSec subset filter s2, but subset filters s1 and s3 are not consistent with the QOS filter.

Figure 5:
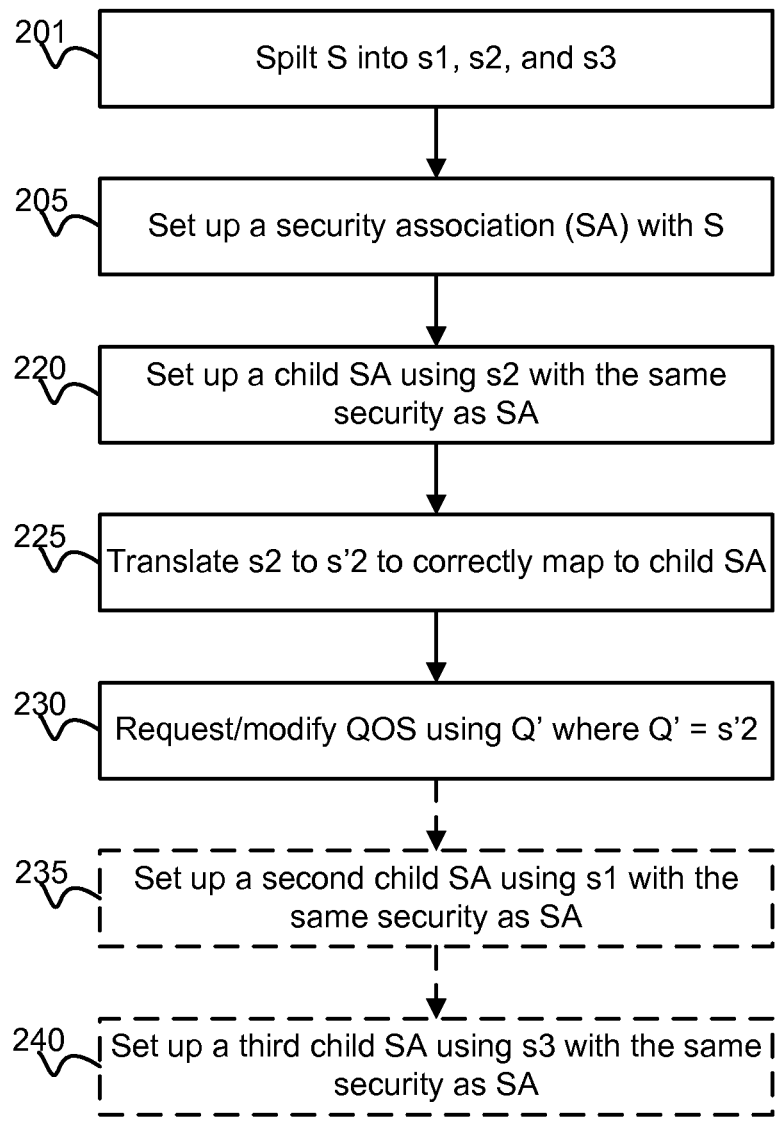

FIG. 5 illustrates a process flow of an embodiment method for translating a QOS filter or IPSec filter when the intersection between the QOS flow and the IPSec flow includes the QOS flow as illustrated in FIG. 2B. In this situation, the IPSec filter set S may be split into a first group of subset filters s1, s2, s3 such that the IPSec filter set S equals the sum of the three subset filters s1, s2, s3, and subset filter s2 is selected to be the QOS filter (s2=Q) such that s2 performs same packet classification as Q, step 201. After the IPSec filter set S is split up, a security association (SA) is setup with the IPSec filter set S, step 205. Next a child security association is setup using s2 with the same security associations as SA, step 220. The subset filter s2 (which is equivalent to the QOS filter) is translated to s'2, step 225. Translated subset filter s'2 will generate the same flows on encrypted packets as subset filter s2 will generate on unmodified packets. The QOS filter Q is then translated into translated QOS filter Q', where filter Q' is the same as filter S'2, step 230. Optionally, a second Child SA may be setup using subset IPSec filter s1 to establish a second child security association, optional step 235. Further, a third Child SA may be set up with the same security SA using subset IPSec filter s3, optional step 240.

Figure 2C:
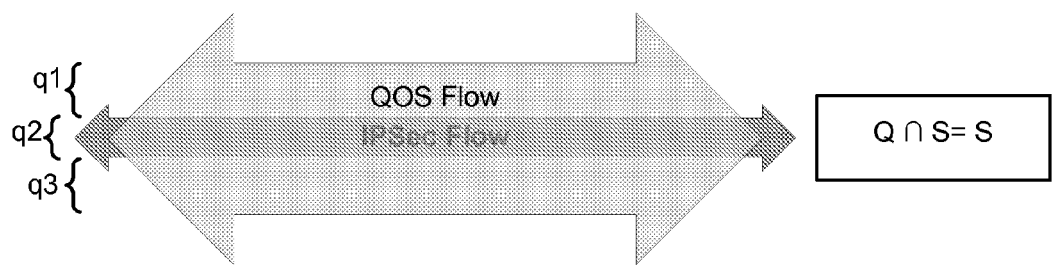

FIG. 2C depicts the network scenario in which the IPSec flows are less than the QOS flows such that the intersection of the QOS flows with the IPSec flows encompasses the IPSec flows (i.e., Q∩S=S). In such a situation, all of the IP data packets subject to the IPSec filter are also subject to the QOS filter, but a number of the IP data packets subject to the QOS filter are not subject to the IPSec filter. In the illustrated example, all of the IP data packets subject to the IPSec filter S may also be subject to the QOS subset filter q2.

Figure 6:
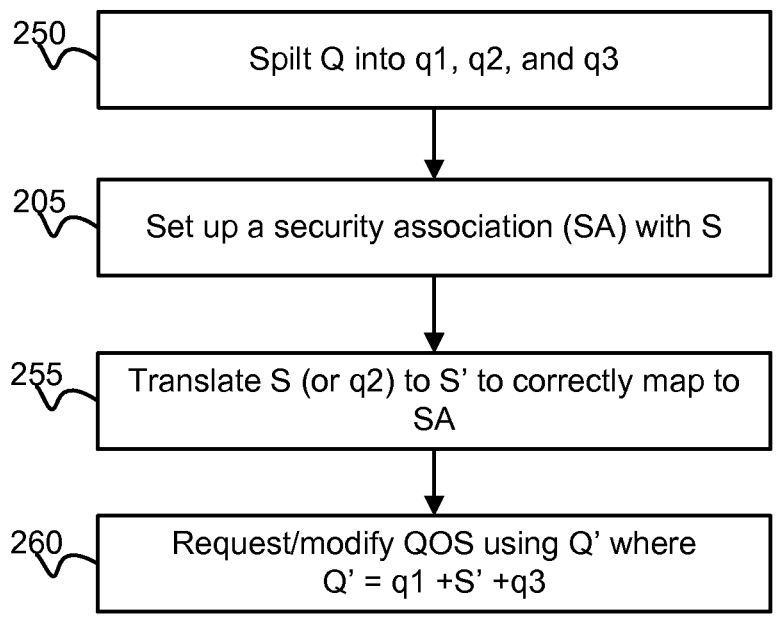

FIG. 6 illustrates a process flow of an embodiment method for translating a QOS filter or IPSec filter when the intersection between the QOS flow and the IPSec flow includes the IPSec flow as illustrated in FIG. 2C. In this situation, the QOS filter may be split into a first group of subset filters q1, q2, q3 such that the QOS filter set Q equals the sum of the three subset filters q1, q2, q3, and subset filter q2 is selected to be the IPSec filter (q2=S) such that q2 performs the same packet classification as S, step 250. After the QOS filter is split, a security association (SA) is setup with the IPSec filter set S, step 205. Next the IPSec filter set S (which is equivalent to subset QOS filter q2) is translated to translated IPSec filter S', step 255. Translated IPSec filter S' will generates the same flows on modified packets as IPSec filter S generates on unmodified packets. The QOS filter Q is then translated to yield translated QOS filter Q', in which Q' is equivalent to the sum of subset QOS filter q1, translated IPSec filter S', and subset QOS filter q3 (i.e., Q'=q1+S'+q3), step 260.

Figure 2D:
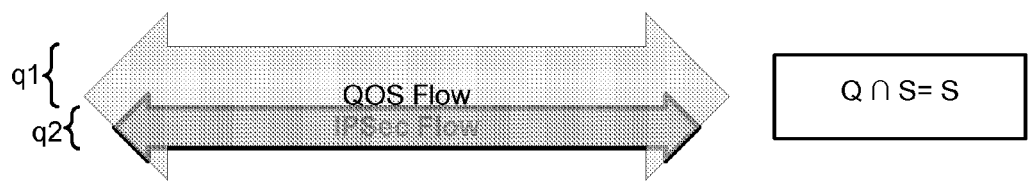

FIG. 2D depicts the network scenario in which the IPSec flows are a subset of the QOS flows such that the intersection of the QOS flows with the IPSec process flows encompasses the IPSec flows (i.e., Q∩S=S). In such a situation, all of the IP data packets subject to the IPSec filter are also subject to the QOS filter, but a number of the IP data packets subject to the QOS filter are not subject to the IPSec filter. In the illustrated example, all of the IP data packets subject to the IPSec filter S may also be subject to the QOS subset filter q2.

Figure 7:
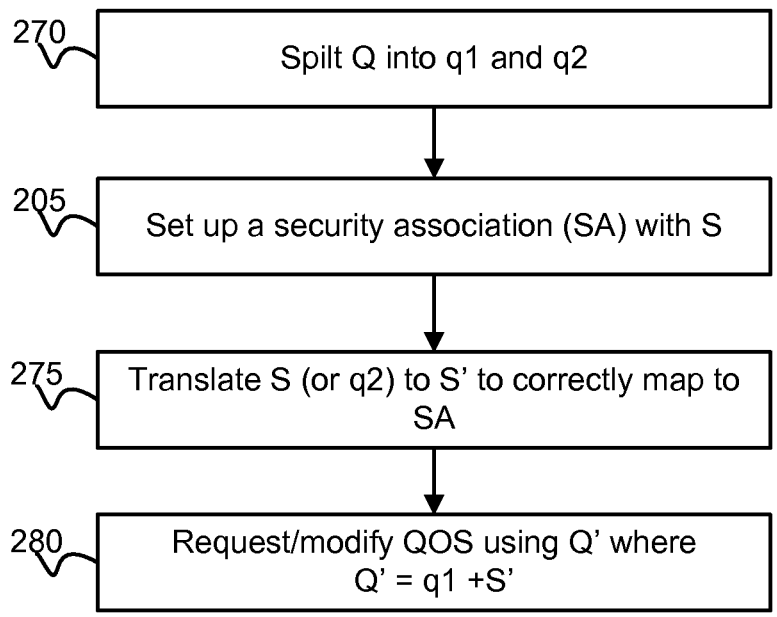

FIG. 7 illustrates a process flow of an embodiment method for translating a QOS filter or IPSec filter when the intersection between the QOS flow and the IPSec flow includes the IPSec flow as illustrated in FIG. 2D. In this situation, the QOS filter may be split into a first group of subset filters q1, q2 such that the QOS filter set Q equals the sum of the two subset QOS filters q1, q2, and subset QOS filter q2 is selected to be the IPSec filter (q2=S), step 270. After the QOS filter is split, a security association (SA) is setup with the IPSec filter set S, step 205. Next, the IPSec filter set S (which is equivalent to the subset QOS filter q2) is translated to yield the translated IPSec filter S', step 275. Translated IPSec filter S' will generate the same flows on encrypted packets as IPSec filter S will generate on unmodified packets. The QOS filter Q is then translated to yield translated QOS filter Q' in which Q' is equivalent to the sum of subset QOS filter q1 and translated IPSec filter S' (i.e., Q'=q1+S'), step 280.

Figure 2E:
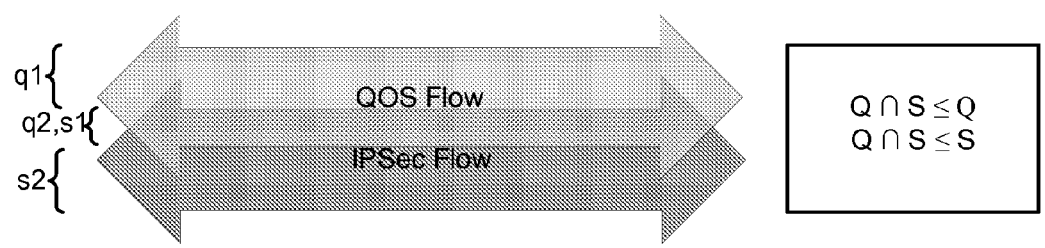

FIG. 2E depicts the network scenario in which a portion of the IPSec flows intersect with a portion of the QOS flows such that the intersection of the QOS flows with the IPSec flows encompasses something less than or equal to the QOS flows and less than or equal to the IPSec flows (i.e., $Q \cap S \leq S$; $Q \cap S \leq Q$). In such a situation, some of the IP data packets subject to the QOS filter are also subject to the IPSec filter, and vice versa. In this situation, there may be varying levels of security encryption implemented by the IPSec filter set S. Each of these varying levels of security may be represented by subset security filters s1, s2. In the illustrated example, the IP data packets subject to the QOS subset filter q2 may also be subject to the IPSec subset filter s1.

Figure 8:
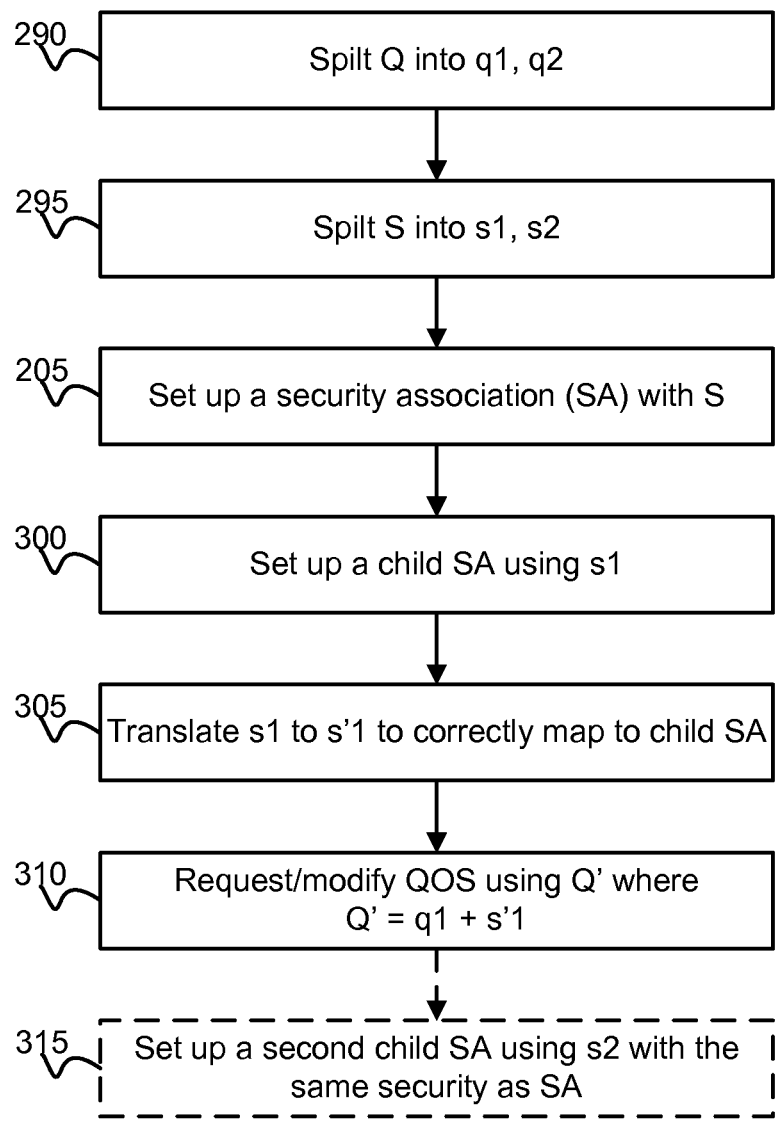

FIG. 8 illustrates a process flow of an embodiment method for translating a QOS filter or IPSec filter when the intersection between the QOS flow and the IPSec flow is less than or equal to the QOS flow and is also less than or equal to the IPSec flow as illustrated in FIG. 2E. In this situation, the QOS filter may be split into a first group of subset QOS filters q1, q2 such that the QOS filter set Q equals the sum of the two subset QOS filters q1, q2, step 290. The IPSec filter may similarly be spilt into a second group of subset IPSec filters s1, s2 such that the IPSec filter set S equals the sum of the two subset IPSec filters s1, s2, step 295. Additionally, QOS subset filter q2 performs the same packet classification as subset IPSec filter s1. A security association (SA) is then setup with the IPSec filter set S, step 205. Next, a first child security association (SA) is setup using the subset IPSec filter s1, which is the subset of the IPsec filter set S that is equivalent to or consistent with the subset QOS filter q2, step 300. The subset IPsec filter s1 is then translated into translated subset IPSec filter s'1 so that modified IP data packets will be correctly mapped to the first child SA, step 305. Because the subset IPSec filter s1 is equivalent to or consistent with the subset QOS filter q2, subset filter s'1 can be used to provide QOS classification instead of subset QOS filter q2. The QOS filter set Q is then translated into translated QOS filter set Q' in which Q' is equivalent to the sum of subset QOS filter q1, and translated subset IPSec filter s'1 (i.e., Q'=q1+s'1), step 310. Optionally, a second Child SA may be setup using subset IPSec filter s2 to establish the second child security association, optional step 315.

As mentioned above, the node within the network path that determines that an IP data packet is subject to conflicting processing (e.g., QOS and IPSec) may determine the nature of packet modifications that will occur over the communication path (e.g., encryption) and the degree to which there is an overlap or intersection between a first set of packet filters, such as IPSec filters, and a second set of packet filters, such as QOS filters, in the given communication path. The nature of the packet modifications may be determined based upon the applications transmitting and receiving data, including whether an application has requested modifications to packets such as implementation of security measures (e.g., IPSec), or upon the packet processing that a particular node is required to perform. The degree of overlap or intersection may be determined based upon the packet processing the node is required to perform, and the types of communication links involved in a given communication session (e.g., wireless communication links connecting to the Internet). Given a set of first and second filters, such as filters S and Q, the process for determining the overlap, intersection or common subset between the Q and S filters in order to apply one of the cases above is implementation dependent (i.e., dependent upon the communicating devices and the network topology).

Irrespective of how the problem of determining the common subset between Q and S is solved, the above described methods can be used to appropriately translate the filters.

There are several other factors to consider when translating filters. The above methods only describe detailed translation methods for Mobile IP and IPSec. Similar concepts can be applied to other protocols or use cases. Other use cases for IP tunneling include IPv4-IPv6 interworking, shipping IP packets over non IP transports (often used in back end wireless networks), etc. The QOS and IPSec filter translation methods described above can be extended to other per flow use cases while doing IPSec, such as classification for header compression, accounting, firewalling, etc. Depending upon the network topology/architecture, a modified version this invention can be applied to solve such problems.

In some cases filter translation alone may not provide the same flow classification, such as in implementations where there are not enough parameters available to translate filters and enable distinguishing the same set of flows after the processing of IP data packets. For example, in the case of IP data packets subject to IPSec processing, if the network path involves only one tunnel/security association, translating filters alone will not be able to support multiple flows. To resolve this problem, additional IP tunnels can be established so that nodes can distinguish different flows beyond IPSec. In such cases, additional control procedures may also be implemented, such as establishing an additional tunnel/security association to achieve the same flow classification after IP packet modification in a particular layer/node.

Figure 9:
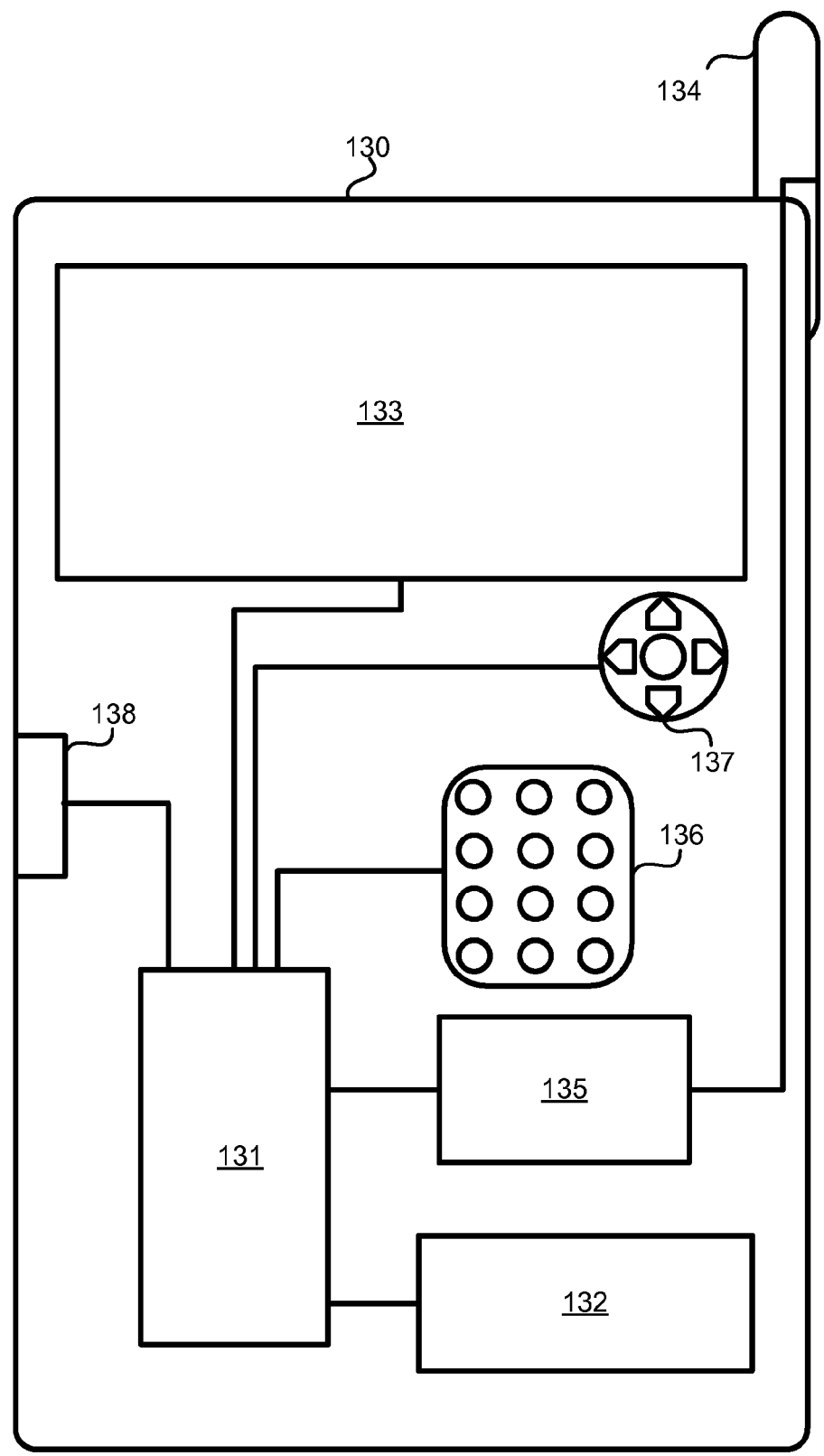
FIG. 9 is a component block diagram of a mobile device suitable for implementing the various embodiments.

The embodiments described above may be implemented on any of a variety of mobile devices. Typically, such mobile devices will have in common the components illustrated in FIG. 9. For example, the mobile devices 130 may include a processor 131 coupled to internal memory 132 and a display 133. Additionally, the mobile device 130 will have an antenna 134 for sending and receiving electromagnetic radiation that is connected to a wireless data link and/or cellular telephone transceiver 135 coupled to the processor 131. In some implementations, the transceiver 135 and portions of the processor 131 and memory 132 used for cellular telephone communications is referred to as the air interface since it provides a data interface via a wireless data link. Mobile devices 130 also typically include a key pad 136 or miniature keyboard and menu selection buttons or rocker switches 137 which serve as pointing devices for receiving user inputs for positioning a cursor within the display 133. The processor 131 may further be connected to a wired network interface 138, such as a universal serial bus (USB) or FireWire® connector socket, for connecting the processor 131 to an external pointing device (e.g., a mouse) or computing device such as a personal computer 160 or external local area network.

The processor 131 may be any programmable microprocessor, microcomputer or multiple processor chip or chips that can be configured by software instructions (applications) to perform a variety of functions, including the functions of the various embodiments described above. In some mobile devices 130, multiple processors 131 may be provided, such as one processor dedicated to wireless communication functions and one processor dedicated to running other applications. The processor may also be included as part of a communication chipset. Typically, software applications may be stored in the internal memory 132 before they are accessed and loaded into the processor 131. In some mobile devices 130, the processor 131 may include internal memory sufficient to store the application software instructions. For the purposes of this description, the term memory refers to all memory accessible by the processor 131, including internal memory 132 and memory within the processor 131 itself.

Application data files are typically stored in the memory 132. In many mobile devices 130, the memory 132 may be a volatile or nonvolatile memory, such as flash memory, or a mixture of both.

Figure 10:
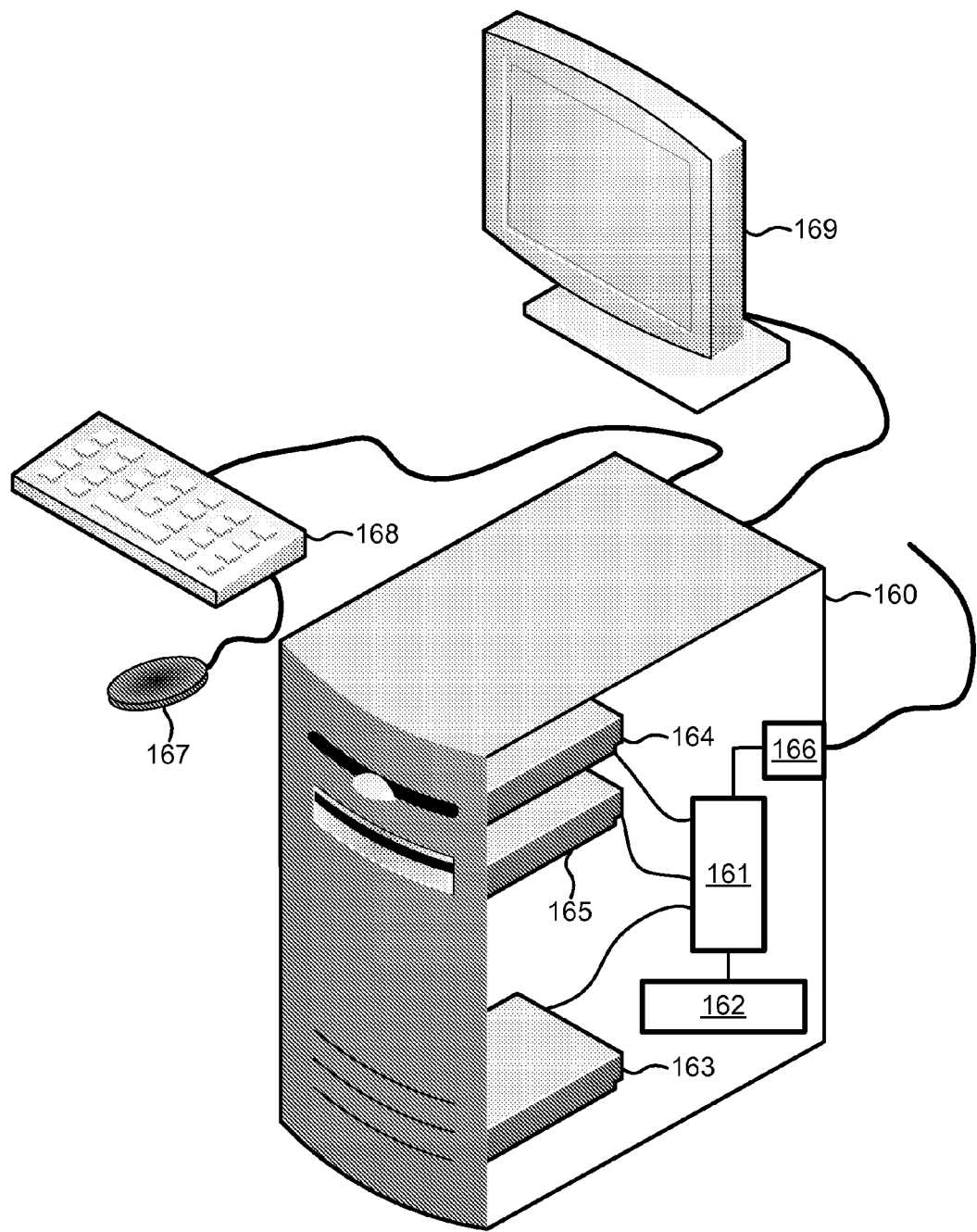
FIG. 10 is a component block diagram of a computer suitable for implementing the various embodiments.

The embodiments described above may also be implemented on any of a variety of computing devices, such as a personal computer 160 illustrated in FIG. 10. Such a personal computer 160 typically includes a processor 161 coupled to volatile memory 162 and a large capacity nonvolatile memory, such as a disk drive 163. The computer 160 may also include a floppy disc drive 164 and a compact disc (CD) drive 165 coupled to the processor 161. Typically the computer device 160 will also include a pointing device such as a mouse 167, a user input device such as a keyboard 168 and a display 166. The computer device 160 may also include a number of connector ports coupled to the processor 161 for establishing data connections or receiving external memory devices, such as a USB or FireWire® connector sockets or other network connection circuits 166 for coupling the processor 161 to a network. In a notebook configuration, the computer housing includes the pointing device 167, keyboard 168 and the display 169 as is well known in the computer arts.

The various embodiments may be implemented by a computer processor 131, 161 executing software instructions configured to implement one or more of the described methods. Such software instructions may be stored in memory 132, 162, 163 as separate applications, or as compiled software implementing an embodiment method. Reference database may be stored within internal memory 132, 162, in hard disc memory 164, on tangible storage medium or on servers accessible via a network (not shown). The instructions can reside in various types of signal-bearing or data storage primary, secondary, or tertiary media. For example, the media may comprise random access memory (RAM) accessible by, or residing within, the components of the wireless network. Further, the software instructions and databases may be stored on any form of tangible processor-readable memory, including: a random access memory 162, hard disc memory 163, a floppy disc (readable in a floppy disc drive 164), a compact disc (readable in a CD drive 165), electrically erasable/programmable read only memory (EEPROM), read only memory (such as FLASH memory and flash memory cards), magnetic tape, an optical storage device (e.g. CD-ROM, DVD, digital optical tape), paper "punch" cards, and/or a memory module (not shown) plugged into the computer 160, such as an external memory chip or a USB-connectable external memory (e.g., a "flash drive") plugged into a USB network port 166.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the steps of a method described above and shown in the figures is for example purposes only as the order of some steps may be changed from that described herein without departing from the spirit and scope of the present invention and the claims.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for processing network communications, comprising:
   determining whether processing of Internet Protocol (IP) data packets within a network path will render a packet filter ineffective at classifying the IP data packets due to modifications of the IP data packets resulting from the processing;
   translating the packet filter based upon the modifications of the IP data packets resulting from the processing so that the translated packet filter results in a desired packet classification of the modified IP data packets in response to determining that processing of IP data packets within a network path will render the packet filter ineffective at classifying the IP data packets due to modifications of the IP data packets resulting from the processing; and
   deploying the translated packet filter to at least one router within the network path.

2. The method of claim 1, further comprising:
   establishing an additional tunnel to achieve the desired packet classification after IP data packets are modified in a particular node of the network path.

3. The method of claim 1, wherein the network path includes a first set of packet filters and a second set of packet filters, the method further comprising:
   determining an intersection of the first set of packet filters and the second set of packet filters in the network path;
   translating the first set of packet filters so that the translated first set of packet filters results in a desired packet classification of modified IP data packets; and
   translating the second set of packet filters based upon the determined intersection of the first and second sets of packet filters so that the translated second set of packet filters results in a desired packet classification of modified IP data packets.

4. The method of claim 3, wherein translating the first set of packet filters comprises translating a first subset filter within the first set of packet filters so that the translated first subset filter results in desired packet classification of modified packets.

5. The method of claim 3, wherein translating the second set of packet filters comprises translating a second subset filter within the second set of packet filters based upon the determined intersection of the first and second sets of packet filters and the translated first set of packet filters.

6. The method of claim 4, wherein:
the second set of packet filters comprises a plurality of second subset filters; and
translating the second set of packet filters comprises substituting the translated first subset filter for one of the plurality of second subset filters within the second set of packet filters.

7. The method of claim 3, further comprising establishing a first security association with the first set of filters, wherein translating the first set of packet filters correctly maps packets to the established first security association.

8. The method of claim 3, wherein translating the second set of packet filters comprises setting the second set of packet filters equal to the translated first set of packet filters.

9. The method of claim 5, wherein translating a second subset filter within the second set of packet filters comprises setting the second subset filter equal to the translated first set of packet filters.

10. The method of claim 7, further comprising:
splitting the first set of packet filters into a plurality of subset filters; and
establishing a first child security association for one of the plurality of subset filters such that the first child security association matches the first security association,
wherein translating the second set of packet filters correctly maps packets to the established first child security association.

11. The method of claim 10, further comprising establishing a second child security association for a third subset filter within the first set of packet filters such that the second child security association matches the first security association.

12. The method of claim 11, further comprising establishing a third child security association for a fourth subset filter within the first set of packet filters such that the third child security association matches the first security association.

13. A computer, comprising:
a processor; and
a memory coupled to the processor,
wherein the processor is configured with software instructions to perform steps comprising:
determining whether processing of Internet Protocol (IP) data packets within a network path will render a packet filter ineffective at classifying the IP data packets due to modifications of the IP data packets resulting from the processing;
translating the packet filter based upon the modifications of the IP data packets resulting from the processing so that the translated packet filter results in a desired packet classification of the modified IP data packets in response to determining that processing of IP data packets within a network path will render the packet filter ineffective at classifying the IP data packets due to modifications of the IP data packets resulting from the processing; and
deploying the translated packet filter to at least one router within the network path.

14. The computer of claim 13, wherein the processor is configured with software instructions to perform further steps comprising:
establishing an additional tunnel to achieve the desired packet classification after IP data packets are modified in a particular node of the network path.

15. The computer of claim 13, wherein the processor is configured with software instructions to perform further steps comprising:
determining an intersection of the first set of packet filters and the second set of packet filters in the network path;
translating the first set of packet filters so that the translated first set of packet filters results in a desired packet classification of modified IP data packets; and
translating the second set of packet filters based upon the determined intersection of the first and second sets of packet filters so that the translated second set of packet filters results in a desired packet classification of modified IP data packets.

16. The computer of claim 15, wherein the processor is configured with software instructions to perform such that translating the first set of packet filters comprises translating a first subset filter within the first set of packet filters so that the translated first subset filter results in desired packet classification of modified packets.

17. The computer of claim 15, wherein the processor is configured with software instructions to perform steps such that translating the second set of packet filters comprises translating a second subset filter within the second set of packet filters based upon the determined intersection of the first and second sets of packet filters and the translated first set of packet filters.

18. The computer of claim 16, wherein the processor is configured with software instructions to perform steps such that:
the second set of packet filters comprises a plurality of second subset filters; and
translating the second set of packet filters comprises substituting the translated first subset filter for one of the plurality of second subset filters within the second set of packet filters.

19. The computer of claim 15, wherein the processor is configured with software instructions to perform further steps comprising establishing a first security association with the first set of filters, wherein translating the first set of packet filters correctly maps packets to the established first security association.

20. The computer of claim 15, wherein the processor is configured with software instructions to perform steps such that translating the second set of packet filters comprises setting the second set of packet filters equal to the translated first set of packet filters.

21. The computer of claim 17, wherein the processor is configured with software instructions to perform steps such that translating a second subset filter within the second set of packet filters comprises setting the second subset filter equal to the translated first set of packet filters.

22. The computer of claim 19, wherein the processor is configured with software instructions to perform further steps comprising:
splitting the first set of packet filters into a plurality of subset filters; and
establishing a first child security association for one of the plurality of subset filters such that the first child security association matches the first security association, wherein translating the second set of packet filters correctly maps packets to the established first child security association.

23. The computer of claim 22, wherein the processor is configured with software instructions to perform further steps comprising establishing a second child security association for a third subset filter within the first set of packet filters such that the second child security association matches the first security association.

24. The computer of claim 23, wherein the processor is configured with software instructions to perform further steps comprising establishing a third child security association for a fourth subset filter within the first set of packet filters such that the third child security association matches the first security association.

25. A computer, comprising:
means for determining whether processing of Internet Protocol (IP) data packets within a network path will render a packet filter ineffective at classifying the IP data packets due to modifications of IP data packets resulting from the processing;
means for translating the packet filter based upon the modifications of the IP data packets resulting from the processing so that the translated packet filter results in a desired packet classification of the modified IP data packets in response to determining that processing of IP data packets within a network path will render the packet filter ineffective at classifying the IP data packets due to modifications of the IP data packets resulting from the processing; and
means for deploying the translated packet filter to at least one router within the network path.

26. The computer of claim 25, further comprising:
means for establishing an additional tunnel to achieve the desired packet classification after IP data packets are modified in a particular node of the network path.

27. The computer of claim 25, wherein the network path includes a first set of packet filters and a second set of packet filters, the method further comprising:
means for determining an intersection of the first set of packet filters and the second set of packet filters in the network path;
means for translating the first set of packet filters so that the translated first set of packet filters results in a desired packet classification of modified IP data packets; and
means for translating the second set of packet filters based upon the determined intersection of the first and second sets of packet filters so that the translated second set of packet filters results in a desired packet classification of modified IP data packets.

28. The computer of claim 27, wherein means for translating the first set of packet filters comprises means for translating a first subset filter within the first set of packet filters so that the translated first subset filter results in desired packet classification of modified packets.

29. The computer of claim 27, wherein means for translating the second set of packet filters comprises means for translating a second subset filter within the second set of packet filters based upon the determined intersection of the first and second sets of packet filters and the translated first set of packet filters.

30. The computer of claim 28, wherein:
the second set of packet filters comprises a plurality of second subset filters; and
means for translating the second set of packet filters comprises means for substituting the translated first subset filter for one of the plurality of second subset filters within the second set of packet filters.

31. The computer of claim 27, further comprising means for establishing a first security association with the first set of filters, wherein means for translating the first set of packet filters correctly maps packets to the established first security association.

32. The computer of claim 27, wherein means for translating the second set of packet filters comprises means for setting the second set of packet filters equal to the translated first set of packet filters.

33. The computer of claim 29, wherein means for translating a second subset filter within the second set of packet filters comprises means for setting the second subset filter equal to the translated first set of packet filters.

34. The computer of claim 31, further comprising:
means for splitting the first set of packet filters into a plurality of subset filters; and
means for establishing a first child security association for one of the plurality of subset filters such that the first child security association matches the first security association,
wherein means for translating the second set of packet filters correctly maps packets to the established first child security association.

35. The computer of claim 34, further comprising means for establishing a second child security association for a third subset filter within the first set of packet filters such that the second child security association matches the first security association.

36. The computer of claim 35, further comprising means for establishing a third child security association for a fourth subset filter within the first set of packet filters such that the third child security association matches the first security association.

37. A non-transitory computer readable storage medium having stored thereon processor-executable instructions configured to cause a processor of a computing device to perform operations comprising:
determining whether processing of Internet Protocol (IP) data packets within a network path will render a packet filter ineffective at classifying the IP data packets due to modifications of the IP data packets resulting from the processing;
translating the packet filter based upon the modifications of the IP data packets resulting from the processing so that the translated packet filter results in a desired packet classification of the modified IP data packets in response to determining that processing of IP data packets within a network path will render the packet filter ineffective at classifying the IP data packets due to modifications of the IP data packets resulting from the processing; and
deploying the translated packet filter to at least one router within the network path.

38. The non-transitory computer readable storage medium of claim 37, wherein the stored processor-executable instructions are configured to cause a processor of a computing device to perform operations further comprising:
establishing an additional tunnel to achieve the desired packet classification after IP data packets are modified in a particular node of the network path.

39. The non-transitory computer readable storage medium of claim 37, wherein the stored processor-executable instructions are configured to cause a processor of a computing device to perform operations further comprising:
determining an intersection of a first set of packet filters and a second set of packet filters in a network path;

translating the first set of packet filters so that the translated first set of packet filters results in a desired packet classification of modified IP data packets; and translating the second set of packet filters based upon the determined intersection of the first and second sets of packet filters so that the translated second set of packet filters results in a desired packet classification of modified IF data packets.

40. The non-transitory computer readable storage medium of claim 39, wherein the stored processor-executable instructions are configured to cause a processor of a computing device to perform operations such that translating the first set of packet filters comprises translating a first subset filter within the first set of packet filters so that the translated first subset filter results in desired packet classification of modified packets.

41. The non-transitory computer readable storage medium of claim 39, wherein the stored processor-executable instructions are configured to cause a processor of a computing device to perform operations such that translating the second set of packet filters comprises translating a second subset filter within the second set of packet filters based upon the determined intersection of the first and second sets of packet filters and the translated first set of packet filters.

42. The non-transitory computer readable storage medium of claim 40, wherein the stored processor-executable instructions are configured to cause a processor of a computing device to perform operations such that:

the second set of packet filters comprises a plurality of second subset filters; and translating the second set of packet filters comprises substituting the translated first subset filter for one of the plurality of second subset filters within the second set of packet filters.

43. The non-transitory computer readable storage medium of claim 39, wherein the stored processor-executable instructions are configured to cause a processor of a computing device to perform operations further comprising establishing a first security association with the first set of filters, wherein translating the first set of packet filters correctly maps packets to the established first security association.

44. The non-transitory computer readable storage medium of claim 39, wherein the stored processor-executable instructions are configured to cause a processor of a computing device to perform operations such that translating the second set of packet filters comprises setting the second set of packet filters equal to the translated first set of packet filters.

45. The non-transitory computer readable storage medium of claim 41, wherein the stored processor-executable instructions are configured to cause a processor of a computing device to perform operations such that translating a second subset filter within the second set of packet filters comprises setting the second subset filter equal to the translated first set of packet filters.

46. The non-transitory computer readable storage medium of claim 43, wherein the stored processor-executable instructions are configured to cause a processor of a computing device to perform operations further comprising:

splitting the first set of packet filters into a plurality of subset filters; and establishing a first child security association for one of the plurality of subset filters such that the first child security association matches the first security association, wherein translating the second set of packet filters correctly maps packets to the established first child security association.

47. The non-transitory computer readable storage medium of claim 46, wherein the stored processor-executable instructions are configured to cause a processor of a computing device to perform operations further comprising establishing a second child security association for a third subset filter within the first set of packet filters such that the second child security association matches the first security association.

48. The non-transitory computer readable storage medium of claim 47, wherein the stored processor-executable instructions are configured to cause a processor of a computing device to perform operations further comprising establishing a third child security association for a fourth subset filter within the first set of packet filters such that the third child security association matches the first security association.

49. The method of claim 1, wherein determining whether processing of Internet Protocol (IP) data packets within a network path will render a packet filter ineffective at classifying the IP data packets due to modifications of the IP data packets resulting from the processing comprises determining whether security processing of Internet Protocol (IP) data packets within a network path will render a Quality of Service (QOS) packet filter ineffective at classifying the IP data packets due to modifications of the IP data packets resulting from the security processing.

* * * * *